June 19, 1923.

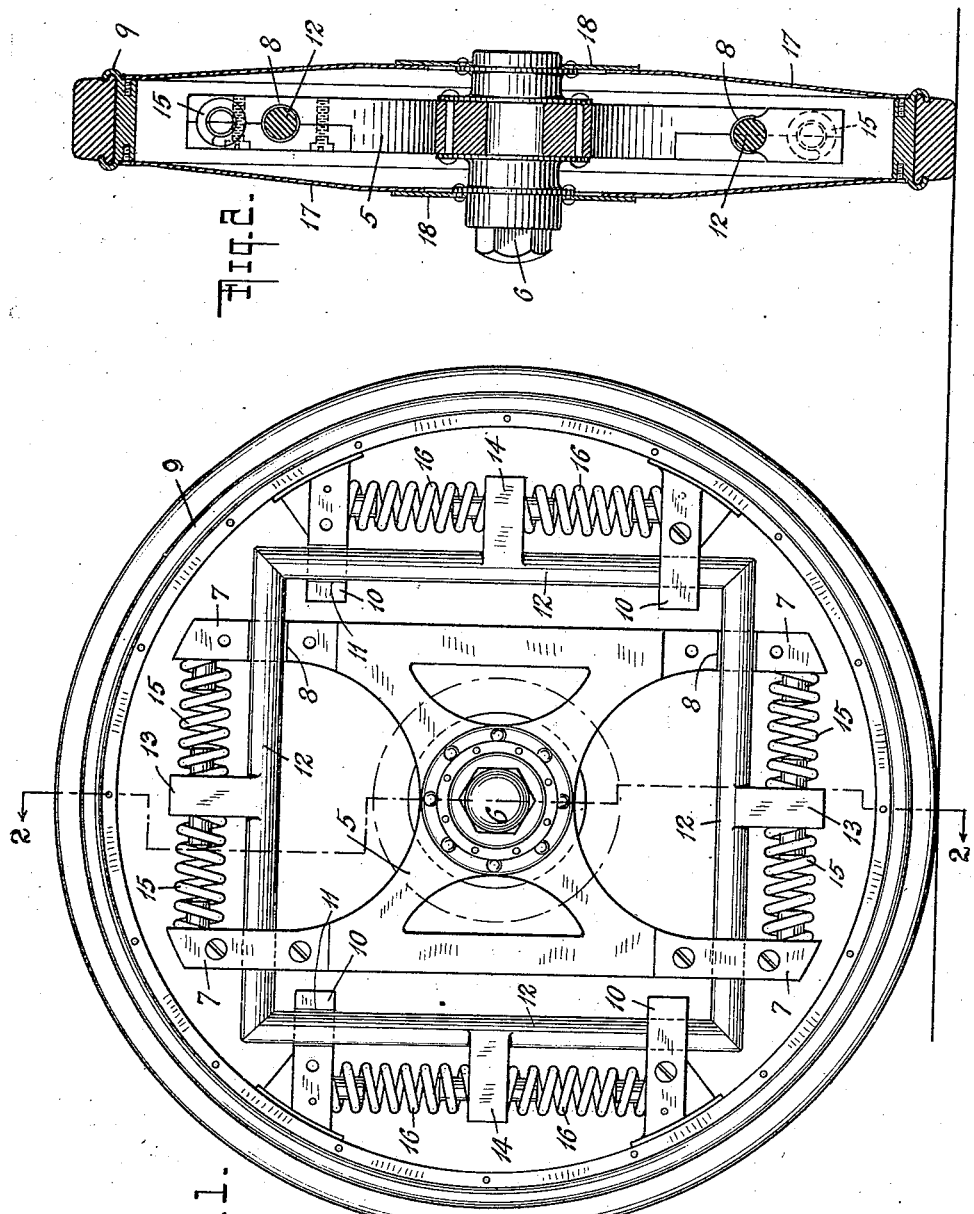

S. YANKAUER 1,459,565

RESILIENT WHEEL

Filed Nov. 13, 1920

2 Sheets-Sheet 2

WITNESSES

INVENTOR
SIDNEY YANKAUER

ATTORNEYS

Patented June 19, 1923.

1,459,565

UNITED STATES PATENT OFFICE.

SIDNEY YANKAUER, OF FLUSHING, NEW YORK.

RESILIENT WHEEL.

Application filed November 13, 1920. Serial No. 423,887.

*To all whom it may concern:*

Be it known that I, SIDNEY YANKAUER, a citizen of the United States, and resident of Flushing, borough and county of Queens, city and State of New York, have invented certain new and useful Improvements in Resilient Wheels, of which the following is a specification.

My invention relates to wheels and more particularly to wheels for automobiles and other self-propelling vehicles and has for its object to provide a resilient wheel of simple and efficient construction in which the resiliency is uniform in all positions of the wheel and in horizontal as well as in vertical directions. My invention will be fully described hereinafter, and the features of novelty will be pointed out in the appended claim.

Figure 4:
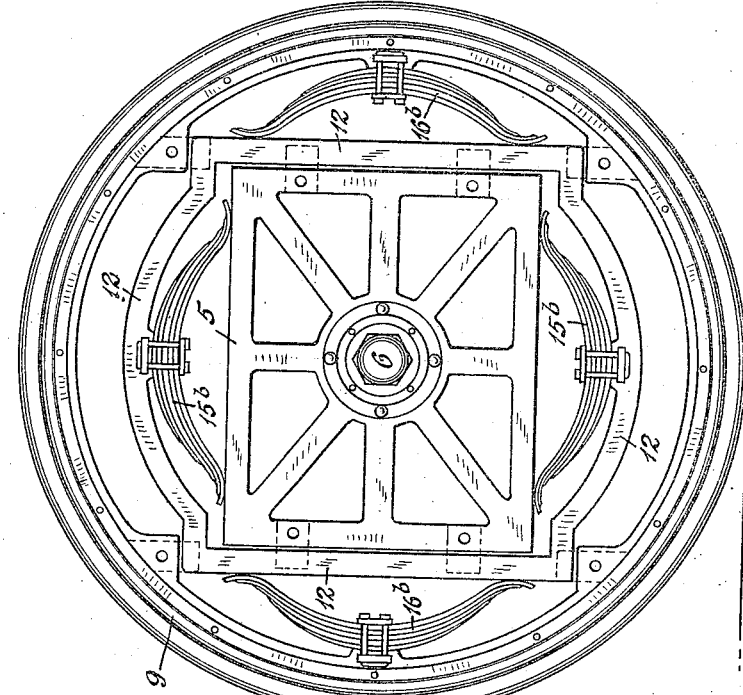

In the accompanying drawings which show several different forms of the invention without defining its limits, Figure 1 is an elevation of the resilient wheel; Fig. 2 is a section thereof on the line 2—2 of Fig. 1; and Figs. 3 and 4 are views similar to Fig. 1 of other variations of said wheel.

In all of its forms, the improved wheel comprises a hub, a rim and a single floating member which, in combination with suitable springs, resiliently connects the hub and rim; and this is the important feature that only a single floating member is interposed between the hub and the rim. Thus, in the form shown, more particularly in Figs. 1 and 2, the wheel comprises a hub 5 which is journalled upon the axle 6 in the customary manner and which is forked in opposite directions for instance by being provided with preferably integral bearing members 7 extending in pairs in opposite directions and formed with guideways 8. The free end surfaces of the hub members 7 are preferably curved in conformity with the curve of the rim 9 and in the neutral position of the parts are spaced therefrom as shown in Fig. 1; the rim 9 may be of any suitable or well known construction and, as illustrated, is provided with inwardly extending bearing members 10 arranged in co-operating pairs and provided with guideways 11 similar to the guideways 8 and terminating at a distance from the hub 5, in the normal position of the wheel. In the preferred arrangement, the guideways 8 and 11 are so located that imaginary lines passing through the centers of each pair of guideways are equidistant from the axis of the wheel. An idler or floating member 12 which, in the illustrated example, is shown as a rectangular frame, is slidably mounted in the guideways 8 and 11 and operatively connects the hub 5 with the rim 9, said member 12 being formed with lugs 13 and 14 which extend outwardly therefrom between the bearing members 7 and 10 respectively. In the illustrated example shown in Fig. 1, the desired resiliency is imparted to the wheel by means of coil springs 15 located between and bearing against the lugs 13 and the bearing members 7 and by similar coil springs 16 extending between and engaging the lugs 14 and the bearing members 10, it being understood that other types of resilient devices may be substituted for said springs 15 and 16 without affecting the efficiency of the wheel.

It will be noted that the floating member 12 is slidable in one direction in the guideways 8 relatively to the hub 5 and in another direction relatively to the rim 9 in the guideways 11, these sliding movements being in directions transverse to each other and being yieldingly resisted by the springs 15 and 16 respectively. The latter press against the lugs 13 and 14 from opposite directions under tension and thus normally maintain the floating member 12 in its neutral position and return it thereto. Assuming that all of the elastic devices, represented in the present instance by the springs 15 and 16, are under equal tension and that they yield to the same extent under corresponding or equal forces, it follows that pressure upon the rim 9 at any point of its circumference will meet with equal resilient resistance either in a radial direction or in a direction tangential to said rim. If all bearings are identical in structure, friction between the parts will be the same in all positions of the wheel so that any loss of elasticity from friction will be the same in any position which the wheel may assume in use. The resiliency of the wheel is, therefore, uniform in every position of the wheel, this being true not only in vertical directions but in horizontal directions as well; the wheel thus possesses a resiliency against traction as well as against any irregularities or obstructions in the road. This horizontal resiliency which is equal to, independent of and acts coincidentally with the vertical resiliency is a novel feature of the present construction.

Figure 3:
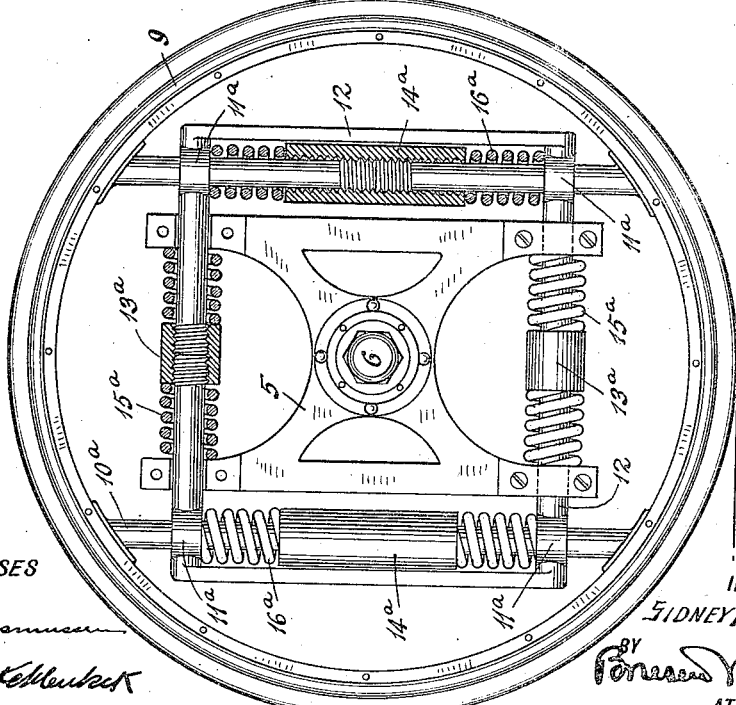

In Fig. 3 the lugs 13 are replaced by collars 13ª upon the member 12, while the lugs 14 are replaced by collars 14ª located upon bearing members 10ª which are substituted for the bearing members 10 and pass through guideways 11ª corresponding in function to the guideways 11 but located upon the floating member 12; the springs 15ª and 16ª corresponding to the springs 15 and 16 are mounted upon the member 12 and guides 10ª as shown. Otherwise the construction of this form may be the same as the form first described, the operation and advantages being also the same.

Referring now to Fig. 4, it will be seen that the floating member 12 is yieldingly supported by means of leaf springs 15ᵇ located directly between said member 12 and the hub 5 and corresponding in action to the springs 15 of Fig. 1 and by means of leaf springs 16ᵇ located directly between the member 12 and the rim 9 and corresponding in function to the springs 16 of Fig. 1. The operation of this form of my improved wheel and its advantages are the same as in the other forms included herein.

In all forms of construction shown and described, the elements are located in the plane of the wheel rim, suitable provision being made in every case to limit the relative resilient movements of the parts and to maintain the latter in proper co-operative relation with each other.

The wheel in all forms is simple in construction and efficient in operation and provides an adequate and satisfactory substitute for the customary pneumatic and other tires, said wheel being resiliently responsive and absorbing all shocks in every direction.

In the preferred form, the wheel is provided with disks 17 and 18 located respectively upon the rim 9 and hub 5 at opposite sides thereof and overlapping at their contiguous peripheries to enclose the wheel as shown in Fig. 2, it being understood that these disks may be included in all forms of the wheel.

Various changes in the specific forms shown and described may be made within the scope of the claim without departing from the spirit of my invention.

I claim:

A resilient wheel comprising a rim, a hub forked in opposite directions, rigid bearing members extending inwardly from said rim in directions transverse to the forks of said hub, a rectangular floating member slidably mounted upon the forked ends of said hub and upon said rigid bearing members, projections on said floating member located in the forks of said hub and between said rigid bearing members, springs located between one set of projections and each of the legs of the forks of said hub whereby the sliding movements of said floating member relatively to the latter are yieldingly resisted and additional springs located between the other set of said projections and said rigid bearing members whereby the sliding movements of said floating member relatively to the latter are yieldingly resisted.

In testimony whereof I have hereunto set my hand.

SIDNEY YANKAUER.